(12) United States Patent
Hashimoto

(10) Patent No.: US 12,275,269 B2
(45) Date of Patent: Apr. 15, 2025

(54) THERMOCHROMIC WRITING INSTRUMENT

(71) Applicant: Kabushiki Kaisha Pilot Corporation, Tokyo (JP)

(72) Inventor: Takeshi Hashimoto, Tokyo (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 135 days.

(21) Appl. No.: 17/915,815

(22) PCT Filed: Mar. 24, 2021

(86) PCT No.: PCT/JP2021/012246
§ 371 (c)(1),
(2) Date: Sep. 29, 2022

(87) PCT Pub. No.: WO2021/200474
PCT Pub. Date: Oct. 7, 2021

(65) Prior Publication Data
US 2023/0150294 A1    May 18, 2023

(30) Foreign Application Priority Data

Mar. 31, 2020 (JP) ................................. 2020-065330

(51) Int. Cl.
*B43K 29/02* (2006.01)
(52) U.S. Cl.
CPC .................................... *B43K 29/02* (2013.01)
(58) Field of Classification Search
CPC ....................................................... B43K 7/005
See application file for complete search history.

(56) References Cited

U.S. PATENT DOCUMENTS 8,282,299 B2 * 10/2012 Ito ........................ B43K 23/12
401/195
10,315,392 B2 * 6/2019 Arici .................... A41B 11/008
(Continued)

FOREIGN PATENT DOCUMENTS

EP    3480028 A1    5/2019
JP    2006123324 A   5/2006
(Continued)

OTHER PUBLICATIONS

Matweb, "Versalis Europrene® SOL TH 2311 Styrene-Ethylene / Butylene Block Copolymer" (Year: 2024).*

*Primary Examiner* — David P Angwin
*Assistant Examiner* — Bradley S Oliver
(74) *Attorney, Agent, or Firm* — The Webb Law Firm

(57) ABSTRACT

Provided is a thermochromic writing instrument, including thermochromic ink; and a friction unit configured to cause handwriting in the thermochromic ink to undergo a thermochromic change by frictional heat. The thermochromic ink includes a metallic luster pigment added thereto. The thermochromic writing instrument is provided with an attachment hole to attach the friction unit. The friction unit includes an attachment portion to be inserted into the attachment hole and a friction portion in a convex curved surface shape projecting from the attachment hole. The friction portion has a volume Ve and the metallic luster pigment has a volume Vp, the volume Ve and the volume Vp satisfying 5 ☐ Ve/Vp ☐ 35, the friction portion 32 has a maximum outer diameter D and a projection length L, the diameter D and the length L satisfying 0.1 ☐ L/D ☐ 1.5, and a material for the friction unit 3 has a value of Shore A hardness in accordance with JIS K 7215 of Japan Industrial Standard measured immediately after starting contact with an indenter in a range of 60 or more and 85 or less and has a value (ΔHS) of the Shore A hardness defined by a (Continued)

following equation of 0 or more and less than 5, ΔHS= (Shore A Hardness Value immediately after Starting Contact with Indenter)−(Shore A Hardness Value 15 seconds after Starting Contact with Indenter).

10 Claims, 6 Drawing Sheets

(56) References Cited

U.S. PATENT DOCUMENTS

| | | | |
|---|---|---|---|
| 10,372,240 B2* | 8/2019 | Malinverni | B43K 29/00 |
| 11,383,547 B2* | 7/2022 | Senga | B43K 24/082 |
| 11,919,324 B2* | 3/2024 | Yamaguchi | B43L 19/0068 |
| 2007/0082977 A1* | 4/2007 | Shibahashi | C09D 11/50 |
| | | | 523/161 |
| 2007/0189836 A1* | 8/2007 | Senga | B43K 23/12 |
| | | | 401/215 |
| 2010/0146731 A1 | 6/2010 | Curren | |
| 2012/0308290 A1 | 12/2012 | Ito | |
| 2023/0047274 A1* | 2/2023 | Yamaguchi | B43K 8/003 |
| 2023/0150294 A1* | 5/2023 | Hashimoto | C09D 11/50 |
| | | | 401/195 |

FOREIGN PATENT DOCUMENTS

| | | |
|---|---|---|
| JP | 2012232484 A | 11/2012 |
| WO | 2018003475 A1 | 1/2018 |
| WO | 2018116767 A1 | 10/2019 |

* cited by examiner

THERMOCHROMIC WRITING INSTRUMENT

CROSS-REFERENCE TO RELATED APPLICATIONS

This application is the United States national phase of International Application No. PCT/JP2021/012246 filed Mar. 24, 2021, and claims priority to Japanese Patent Application No. 2020-065330 filed Mar. 31, 2020, the disclosures of which are hereby incorporated by reference in their entirety.

BACKGROUND OF THE INVENTION

Field of the Invention

The present invention relates to a writing instrument. The present invention further relates to a writing instrument including a friction unit configured to cause handwriting in thermochromic ink to undergo a thermochromic change.

Description of Related Art

In recent years, thermochromic writing instruments are widespread. Such a thermochromic writing instrument contains thermochromic ink. It is possible to change or remove color of handwriting in thermochromic ink by heating. The thermochromic writing instrument includes a friction unit that generates frictional heat to remove or change the color of handwriting in thermochromic ink. It should be noted that "changing color" of thermochromic ink means changing color from a color to another color and "removing color" thereof is an aspect of the changing color and means changing color from being colored to being colorless.

For example, WO 2018/116767 (A1) discloses a writing instrument containing thermochromic ink to which a metallic luster pigment is added. The thermochromic writing instrument includes a friction unit containing a viscoelastic material. This friction unit is capable of chemically and physically erasing thermochromic ink to which a metallic luster pigment is added. That is, the friction unit containing a viscoelastic material removes color of the thermochromic ink by frictional heat and adsorbs the metallic luster pigment by the viscoelastic properties to separate the pigment from a paper surface. As just described, the friction unit containing a viscoelastic material disclosed in International Publication No. WO 2018/116767 is provided with both chemical erasability to remove the color of the thermochromic ink by frictional heat and physical erasability to separate the metallic luster pigment by the viscoelastic properties.

PRIOR ART DOCUMENTS

Patent Document

Patent Document 1: WO 2018/116767 (A1)

SUMMARY OF THE INVENTION

Problems to be Solved by the Invention

However, the friction unit containing a viscoelastic material has a problem that reciprocation (hereinafter, referred to as "friction operation") during abrasion of handwriting in thermochromic ink causes a gradual increase in an amount of deformation of the friction unit. That is, such a viscoelastic material has properties to increase the amount of deformation with the passage of time while a certain external force is applied. Accordingly, repeated friction operation gradually causes the friction unit containing a viscoelastic material to greatly deform. A greater amount of deformation of the friction unit may cause frictional heat for changing or removing the color of handwriting in thermochromic ink not to be generated.

Meanwhile, the amount of deformation of the friction unit can be kept at a constant level by gradually reducing the force for the friction operation of the friction unit. However, the force for the friction operation of the friction unit may be too small to generate the frictional heat for changing or removing the color of handwriting in thermochromic ink. In particular, a friction unit of a synthetic resin has a modulus of elasticity depending on the temperature. Accordingly, when the temperature of the friction unit itself increases by frictional heat and when the friction unit is used in a high temperature environment, the friction unit tends to deform more greatly.

The present invention has been made to solve the problems described above and it is an object thereof to provide a thermochromic writing instrument capable of chemically and physically erasing handwriting in thermochromic ink including a metallic luster pigment added thereto and capable of causing a friction unit to exhibit desired friction performance by inhibiting deformation of the friction unit.

Means to Solve the Problems (1) To achieve the above object, a thermochromic writing instrument of the present invention includes: thermochromic ink; and a friction unit configured to cause handwriting in the thermochromic ink to undergo a thermochromic change by frictional heat, wherein the thermochromic ink includes a metallic luster pigment added thereto, the thermochromic writing instrument is provided with an attachment hole to attach the friction unit, the friction unit includes an attachment portion to be inserted into the attachment hole and a friction portion in a convex curved surface shape projecting from the attachment hole, the friction portion has a volume Ve and the metallic luster pigment has a volume Vp, the volume Ve and the volume Vp satisfying $5 \leq Ve/Vp \leq 35$, the friction portion has a maximum outer diameter D and a projection length L, the diameter D and the length L satisfying $0.1 \leq L/D \leq 1.5$, and a material for the friction unit has a value of Shore A hardness in accordance with JIS K 7215 of Japan Industrial Standard measured immediately after starting contact with an indenter in a range of 60 or more and 85 or less and has a value ($\Delta HS$) of the Shore A hardness defined by a following equation of 0 or more and less than 5, $\Delta HS$=(Shore $A$ Hardness Value immediately after Starting Contact with Indenter)−(Shore $A$ Hardness Value 15 seconds after Starting Contact with Indenter).

The friction unit included in the thermochromic writing instrument according to (1) above is capable of chemically changing or removing the color of handwriting in thermochromic ink by frictional heat and is also capable of physically separating the metallic luster pigment added to the thermochromic ink. Meanwhile, the material for the friction unit with $\Delta HS$ of less than 5 allows the friction portion to have rigidity sufficient for the friction operation. Deformation of the friction portion during the friction operation is thus inhibited to allow the friction portion to exhibit desired friction performance.

(2) It is preferred that, in the thermochromic writing instrument according to (1) above, the material for the friction unit has a value (Tb×Eb) of a product of tensile strength Tb at break and elongation Eb at break measured in accordance with JIS K 6251 of Japan Industrial Standard of 5000 or more and 18000 or less.

The material for the friction unit having the value (Tb× Eb) of the product of tensile strength Tb at break and elongation Eb at break of 5000 or more and 18000 or less causes the friction unit to generate an appropriate amount of wear crumbs during abrasion of the handwriting. It is thus possible to adhere the metallic luster pigment added to the thermochromic ink to the wear crumbs and enclose them.

(3) It is preferred that, in the thermochromic writing instrument according to (1) or (2) above, the attachment hole is provided through a rear end portion of a barrel or an apex of a cap, the barrel and the cap configuring the thermochromic writing instrument, along a longitudinal central axis and has an inner circumferential surface between two openings located at an upper end and a lower end, an inward projection projecting inside the attachment hole is formed on the inner circumferential surface of the attachment hole, an outward projection projecting outside the attachment portion is formed on an outer circumferential surface of the attachment portion, when the attachment portion is inserted into the attachment hole, the outward projection rides over the inward projection to lock the outward projection and the inward projection to each other, the friction unit is provided with a straight internal hole along a longitudinal central axis and opening at least at a lower end of the attachment portion, a rod-like inner core is inserted into the internal hole, the rod-like inner core having a length to be placed within the internal hole and an outer circumferential surface contacting an inner circumferential surface of the internal hole, and, in a state where the attachment portion is inserted into the attachment hole and the inner core is inserted into the internal hole, the inner core is held in a position corresponding to the inner circumferential surface of the attachment hole to configure the attachment portion to be sandwiched between the outer circumferential surface of the inner core and the inward projection of the attachment hole.

The attachment portion of the friction unit is sandwiched between the outer circumferential surface of the inner core and the inward projection of the attachment hole to be firmly fixed to the attachment hole. This causes an increase in the rigidity of the entire friction portion to inhibit deformation of the friction portion during the friction operation and allow the friction portion to exhibit desired friction performance. Particularly, even in the case that the friction portion is formed from a material with low hardness, it is thus possible to provide the entire friction portion with desired rigidity. This allows the handwriting in thermochromic ink to efficiently undergo a thermochromic change. Moreover, after locking the inward projection of the attachment hole and the outward projection of the attachment portion to each other, the inner core is inserted into the internal hole of the friction unit. This allows the friction unit to be readily attached to the thermochromic writing instrument without a large force.

(4) It is preferred that, in the thermochromic writing instrument according to (3) above, in the state where the attachment portion is inserted into the attachment hole and the inner core is inserted into the internal hole, the inner core has a length from an opening at a lower end of the internal hole to the opening at the upper end of the attachment hole.

The inner core having a length from the opening at the lower end of the internal hole to the opening at the upper end of the attachment hole causes, even when the friction portion is worn, the inner core not to be exposed from the friction portion and thus a paper surface is not damaged.

(5) It is preferred that, in the thermochromic writing instrument according to (3) or (4) above, in the state where the attachment portion is inserted into the attachment hole and the inner core is inserted into the internal hole, a lower end of the inner core is located in a position identical to the lower end of the attachment portion or above the lower end of the attachment portion.

The lower end of the inner core being located in a position identical to the lower end of the attachment portion or above the lower end of the attachment portion facilitates the insertion of the inner core into the friction unit and improves the assemblability.

(6) It is preferred that, in the thermochromic writing instrument according to any one of (3) through (5) above, the internal hole is a hole with one closed end opening at the lower end of the attachment portion and not opening at an upper end of the friction portion and, in a process of inserting the inner core into the internal hole, the inner core is provided with a vent portion to discharge air in the internal hole.

In the process of inserting the inner core into the internal hole, the air in the internal hole is not compressed by the inner core and is discharged to the outside. This facilitates the insertion of the inner core into the friction unit and allows the inner core to be securely attached to the internal hole.

(7) It is preferred that, in the thermochromic writing instrument according to (6) above, the vent portion is a through hole penetrating the inner core from an end to another end along a longitudinal central axis of the inner core.

In the process of inserting the inner core into the internal hole, the air in the internal hole is not compressed by the inner core and is securely discharged to the outside through the through hole. This facilitates the insertion of the friction unit into the inner core and allows the inner core to be securely attached to the internal hole.

(8) It is preferred that, in the thermochromic writing instrument according to (6) above, the vent portion is at least one groove or projection continuing from an end to another end of the inner core along the outer circumferential surface of the inner core.

In the process of inserting the inner core into the internal hole, the groove or projection of the inner core forms a gap between the outer circumferential surface of the inner core and the inner circumferential surface of the internal hole. The air in the internal hole is thus not compressed by the inner core and is securely discharged to the outside through the gap formed by the groove or projection. This facilitates the insertion of the inner core into the friction unit and allows the inner core to be securely attached to the internal hole.

(9) It is preferred that, in the thermochromic writing instrument according to any one of (3) through (8) above, the inner core has a vertically symmetrical shape.

The inner core having a vertically symmetrical shape eliminates the difference between the top and the bottom of the inner core. This allows insertion of the inner core from either the top or the bottom into the internal hole and facilitates the operation of mounting the inner core in the internal hole.

(10) It is preferred that, in the thermochromic writing instrument according to any one of (3) through (9) above, the outer circumferential surface of the inner core is provided with a convex portion contacting the inner circumferential surface of the internal hole.

The convex portion provided on the outer circumferential surface of the inner core holds the inner core in the internal hole more firmly. This securely prevents the inner core from falling out of the internal hole.

(11) To achieve the above object, a thermochromic writing instrument of the present invention includes: thermochromic ink; and a friction unit configured to cause handwriting in the thermochromic ink to undergo a thermochromic change by frictional heat, wherein the thermochromic ink includes at least one of a fluorescent pigment, a phosphorescent pigment, or titanium dioxide added thereto, the thermochromic writing instrument is provided with an attachment hole to attach the friction unit, the friction unit includes an attachment portion to be inserted into the attachment hole and a friction portion in a convex curved surface shape projecting from the attachment hole, and a material for the friction unit has a value (Tb×Eb) of a product of tensile strength Tb at break and elongation Eb at break measured in accordance with JIS K 6251 of Japan Industrial Standard of 5000 or more and 18000 or less.

The material for the friction unit having a value (Tb×Eb) of the product of tensile strength Tb at break and elongation Eb at break of 5000 or more and 18000 or less causes the friction unit to generate an appropriate amount of wear crumbs during abrasion of the handwriting. It is thus possible to adhere at least one of a fluorescent pigment, a phosphorescent pigment, or titanium dioxide added to the thermochromic ink to the wear crumbs and enclose them.

Effects of the Invention

The thermochromic writing instrument of the present invention is capable of chemically and physically erasing handwriting in thermochromic ink including the metallic luster pigment added thereto and capable of causing the friction unit to exhibit desired friction performance by inhibiting deformation of the friction unit.

In the present disclosure, the term "front" regarding the thermochromic writing instrument means the direction of a pen point and the term "rear" regarding the thermochromic writing instrument means the direction opposite to the pen point. In addition, the term "upper" regarding the attachment hole means the direction of the rear end portion of the barrel or the direction of the apex of the cap and the term "lower" regarding the attachment hole means the direction opposite to those directions. Moreover, the term "upper" regarding the friction unit means the direction of the friction portion and the term "lower" regarding the friction unit means the direction of the attachment portion. Still in addition, the content of each of a plurality of components constituting a composition herein means, unless otherwise specified, the total amount of substances falling under each component. Further in addition, the term "metallic luster pigment" widely includes pigments capable of providing handwriting in thermochromic ink with lustrous properties. For example, both transparent metallic luster pigments and metallized resin pigments are included in the term "metallic luster pigment".

DESCRIPTION OF THE INVENTION

Figure 1:
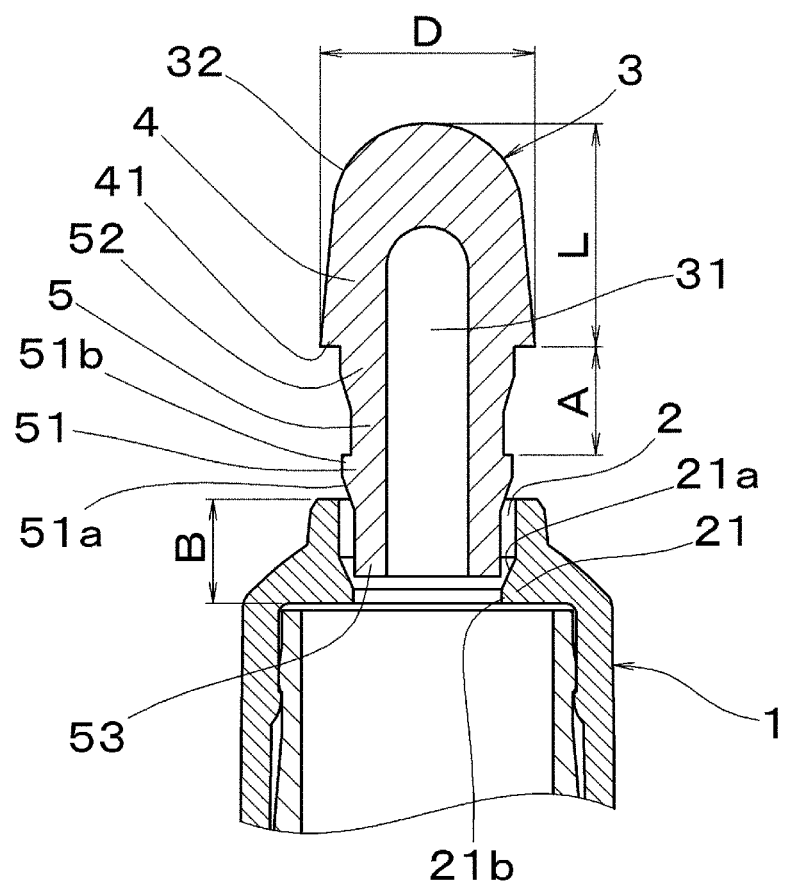
FIG. 1 illustrates major portions of a thermochromic writing instrument according to a first embodiment of the present invention and is a cross-sectional view illustrating a state before an attachment portion of a friction unit is inserted into an attachment hole of a barrel.

A thermochromic writing instrument according to embodiments of the present invention is described below with reference to the drawings.

1. Overview

FIGS. 1 through 4 illustrate major portions of the thermochromic writing instrument according to the first embodiment of the present invention. FIGS. 1 through 4 do not illustrate the entire thermochromic writing instrument but illustrate only a rear end portion of a barrel 1 configuring the thermochromic writing instrument. The thermochromic writing instrument in the present embodiment includes the barrel 1, a friction unit 3, and an inner core 7. An attachment hole 2 is provided at the rear end portion of the barrel 1. The friction unit 3 is attached to the attachment hole 2. The friction unit 3 is provided with an internal hole 31 along a longitudinal central axis. The inner core 7 is inserted into the internal hole 31.

2. Attachment Hole

As illustrated in FIG. 1, the attachment hole 2 is provided at the rear end portion of the barrel 1. The attachment hole 2 penetrates the rear end portion of the barrel 1 along the longitudinal central axis. The attachment hole 2 has an inner circumferential surface between two openings located at the upper end and the lower end. In a lower part of the inner circumferential surface of the attachment hole 2, an annular inward projection 21 is formed. The inward projection 21 has an inner circumferential surface on which a guide surface 21a is formed as a tapered surface in an inverted conical shape. The guide surface 21a has a diameter gradually decreasing downward from the upper part. The guide surface 21a has a lower end continuing to a vertical inner circumferential surface of a minimum diameter portion 21b, which is an opening at the lower end of the attachment hole 2. The attachment hole 2 thus configured has lateral cross sections in circular shapes with different diameters.

The barrel 1 is produced by injection molding a synthetic resin (e.g., polypropylene). The attachment hole 2 and the inward projection 21 are integrally formed as a single piece at the rear end portion of the barrel 1 by injection molding. It should be noted that the attachment hole 2 may be provided at, for example, the apex of a cap configuring the thermochromic writing instrument not limited to the rear end portion of the barrel 1.

3. Friction Unit

As illustrated in FIG. 1, the friction unit 3 in the present embodiment is configured by integrally forming an attachment portion 5 (small diameter portion) with a diameter smaller than that of the friction portion 32 as a single piece under a friction portion 32 (large diameter portion 4) in a bullet shape. The friction portion 32 is used to cause thermochromic ink adhered to a paper surface to undergo a thermochromic change by frictional heat. Moreover, the friction portion 32 in the present embodiment has a function of adsorbing and separating a metallic luster pigment added to the thermochromic ink from the paper surface. The attachment portion 5 is used to attach the friction unit 3 to the attachment hole 2 of the barrel 1.

3.1 Friction Portion (Large Diameter Portion)

The friction portion 32 has an outer circumferential surface in a convex curved surface shape capable of contacting the paper surface at various tilt angles. The friction portion 32 has a diameter at the lower end greater than the diameter of the opening at the upper end of the attachment hole 2 and preferably smaller than the diameter on the rear end surface of the barrel 1. At the boundary between the friction portion 32 and the attachment portion 5, an annular surface 41 abutting on the rear end surface of the barrel 1 is formed. When the attachment portion 5 is attached to the attachment hole 2, the friction portion 32 projects above the rear end surface of the barrel 1.

As illustrated in FIG. 1, the friction portion 32 has a maximum outer diameter D and a projection length L, the diameter D and the length L satisfying $0.1 \leq L/D \leq 1.5$ and preferably satisfying $0.5 \leq L/D \leq 1.1$. A ratio L/D of the projection length L to the maximum outer diameter D of the friction portion 32 is an indication of the size of the area in the friction portion 32 exposed to the outside and the rigidity of the friction portion 32. A value of L/D of 0.1 or more causes the friction portion 32 has the rigidity sufficient for abrasion of handwriting on a paper surface. Meanwhile, a value of L/D of 1.5 or less causes the friction portion 32 to have an exposed area of a size sufficient for erasing a large amount of handwriting. The friction portion 32 in the present embodiment has a maximum outer diameter D=6.1, a projection length L=6.3, and L/D≈1.0.

It should be noted that, in the case of the friction portion 32 in a convex curved surface shape, the friction portion 32 preferably has a thickness thickest in the apex. This causes an increase in the rigidity at and around the apex used during abrasion of handwriting on a paper surface and allows smooth friction operation.

3.2 Attachment Portion

The attachment portion 5 includes a tubular wall portion and has a diameter being smaller than the diameter at the lower end of the friction portion 32 and allowing insertion into the attachment hole 2. At the center of an outer circumferential surface of the attachment portion 5, an annular outward projection 51 is formed. Above the outward projection 51 on the outer circumferential surface of the attachment portion 5, an annular bulged portion 52 is formed. In the attachment portion 5, a cylindrical portion 53 is provided under the outward projection 51.

The outward projection 51 has an outer circumferential surface on which a guide surface 51a is formed as a tapered surface in an inverted conical shape. The guide surface 51a has a diameter gradually increasing upward from the lower part. The guide surface 51a has an upper end continuing to a vertical outer circumferential surface of a maximum outer diameter portion 51b of the outward projection 51. The vertical outer circumferential surface of the maximum outer diameter portion 51b has an upper end continuing to a horizontal annular upper end surface.

The maximum outer diameter portion 51b of the outward projection 51 has a diameter greater than the diameter of a minimum inner diameter portion 21b in the inward projection 21 of the attachment hole 2 described above and smaller than the diameter of the opening at the upper end of the attachment hole 2. For example, the difference in dimensions between the maximum outer diameter portion 51b and the minimum inner diameter portion 21b is ranged from 0.5 mm to 2.0 mm and preferably ranged from 0.5 mm to 1.0 mm. The difference in dimensions thus configured allows, in the process of inserting the attachment portion 5 into the attachment hole 2, smooth passage of the outward projection 51 through the inward projection 21 to readily lock the outward projection 51 to the inward projection 21 (refer to FIGS. 2 and 3).

Figure 3:
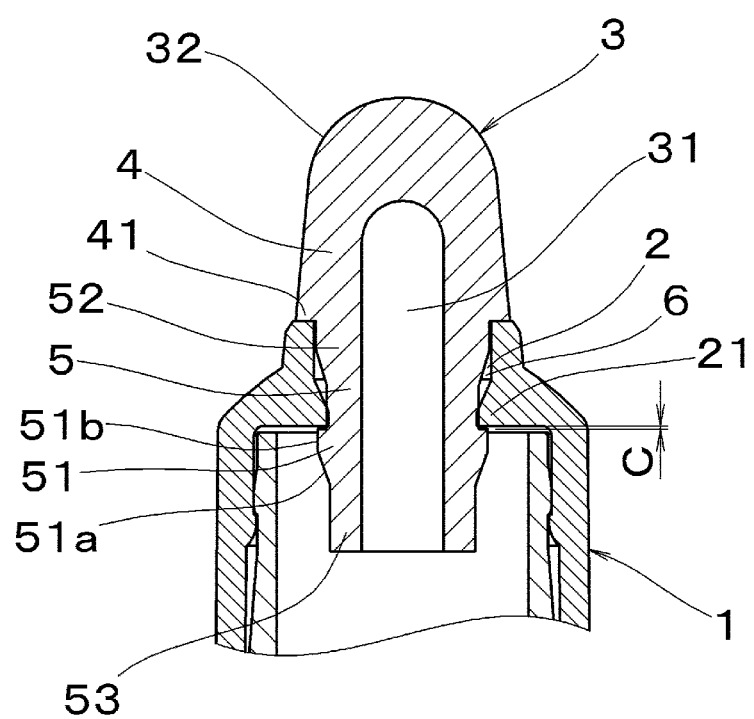
FIG. 3 is a cross-sectional view illustrating a state where the attachment portion of the friction unit is inserted into the attachment hole of the barrel.

The bulged portion 52 contacts the inner circumferential surface of the opening at the upper end of the attachment hole 2 when the attachment portion 5 is fully inserted into the attachment hole 2 (refer to FIG. 3). This allows suppression of radial wobble of the friction unit 3. The bulged portion 52 has a diameter substantially identical to the diameter of the opening at the upper end of the attachment hole 2. The diameter of the bulged portion 52 is smaller than the diameter at the lower end of the friction portion 32 and greater than the diameter of the maximum outer diameter portion 51b of the outward projection 51.

Figure 2:
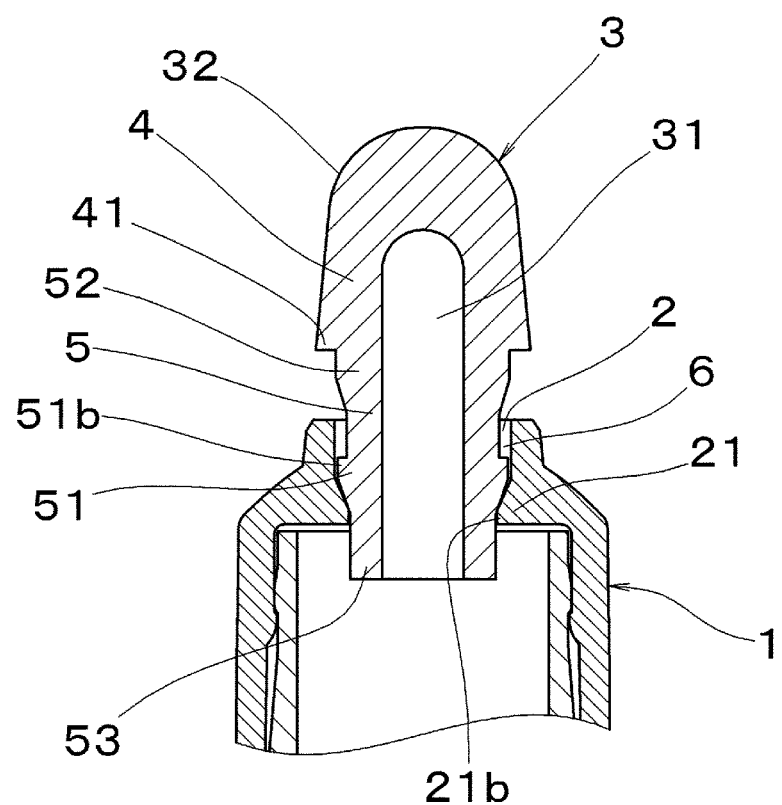
FIG. 2 is a cross-sectional view illustrating a provisional insertion state in the process of inserting the attachment portion of the friction unit into the attachment hole of the barrel.

The cylindrical portion 53 has a diameter smaller than the diameter of the minimum inner diameter portion 21b of the inward projection 21 of the attachment hole 2 described above. The cylindrical portion 53 is provided to cause the attachment portion 5 to be in the provisional insertion state to the attachment hole 2. The provisional insertion state is illustrated in FIG. 2. The cylindrical portion 53 thus configured facilitates the operation of attaching the friction unit 3. That is, the friction unit 3 is dropped into the attachment hole 2 to be in the provisional insertion state illustrated in FIG. 2. The friction unit 3 is then pressed into the attachment hole 2 to fully insert the attachment portion 5 into the attachment hole 2 and simultaneously lock the outward projection 51 to the inward projection 21 (refer to FIG. 3). It should be noted that the outer circumferential surface under the outward projection 51 in the attachment portion 5 is not limited to the circumferential surface of the cylindrical portion 53 and may be, for example, a tapered surface in an inverted conical shape.

3.3 Formation of Annular Space

An intermediate portion (area between the bulged portion 52 and the outward projection 51) of the attachment portion 5 has an outer diameter smaller than the inner diameter around the entrance of the attachment hole 2 (area above the inward projection 21). In the provisional insertion state illustrated in FIG. 2, an annular space 6 is thus formed between the attachment portion 5 and the attachment hole 2. The annular space 6 prevents the intermediate portion of the attachment portion 5 from pressure fitting the inner circumferential surface around the entrance of the attachment hole 2. That is, after the provisional insertion state illustrated in FIG. 2, the outward projection 51 of the attachment portion 5 rides over the inward projection 21 of the attachment hole 2. In this situation, the outward projection 51 is firmly pressure fitted to the inward projection 21, causing the intermediate portion of the attachment portion 5 to be elastically deformed and bulge radially outside. If the intermediate portion of the attachment portion 5 pressure fits the inner circumferential surface around the entrance of the attachment hole 2, frictional resistance turns out to occur that inhibits insertion of the attachment portion 5. The annular space 6 stores the intermediate portion of the attachment portion 5 bulging radially outside to prevent the intermediate portion of the attachment portion 5 from pressure fitting the inner circumferential surface around the entrance of the attachment hole 2.

3.4 Axial Clearance

As illustrated in FIG. 1, a length A from the upper end of the attachment portion 5 to the upper end of the outward projection 51 is slightly larger than a length B from the upper end of the attachment hole 2 to the lower end of the inward projection 21. This causes the entire outward projection 51 to securely pass through the inward projection 21. That is, if the lengths A and B are identical, there is a possibility that the frictional resistance to occur between the outward projection 51 and the inward projection 21 causes the upper end surface of the maximum outer diameter portion 51b of the outward projection 51 not to be capable of passing through the inward projection 21. The length A of the attachment portion 5 slightly larger than the length B of the attachment hole 2 allows the entire outward projection 51 to pass through the inward projection 21 even after the annular surface 41 of the large diameter portion 4 abuts on the rear end of the barrel 1. This allows the entire outward projection 51 to securely pass through the inward projection 21 even if frictional resistance occurs between the outward projection 51 and the inward projection 21. The difference in dimensions between the lengths A and B appears as a clearance C, illustrated in FIG. 3, between the outward projection 51 and the inward projection 21. The clearance C is preferably ranged from 0.05 mm to 1.0 mm and more preferably from 0.1 mm to 0.5 mm. The slight clearance C thus configured does not cause movement of the friction unit 3 in the direction of the central axis and loosening of the locking between the outward projection 51 and the inward projection 21.

3.5 Internal Hole

Inside the friction unit 3, the internal hole 31 is provided. The internal hole 31 is a straight hole provided along the central axis of the friction unit 3 and opens at least at the lower end of the friction unit 3. The internal hole 31 in the present embodiment is a hole with one closed end, the hole reaching the center of the friction portion 32 from the lower end of the attachment portion 5 and not opening at the upper end of the friction portion 32. The internal hole 31 is provided from the lower end of the attachment portion 5 to a position reaching at least the upper end of the outward projection 51. The internal hole 31 thus configured facilitates deformation of the outward projection 51 radially inside. It is this possible to readily lock the outward projection 51 to the inward projection 21. Moreover, the internal hole 31 is subjected to insertion of the inner core 7 described later.

The internal hole 31 in the present embodiment opens at the lower end of the attachment portion 5 of the friction unit 3 and does not open at the upper end of the friction portion 32. If the internal hole 31 opens at the upper end of the friction portion 32, it is not possible to abrade handwriting by the upper end of the friction portion 32, causing reduction in friction performance of the friction portion 32.

The internal hole 31 does not open at the upper end of the friction portion 32, causing an increase in the rigidity of the friction portion 32 and improving the friction performance of the friction portion 32. Such a hole 31 also inhibits deflection of the entire friction unit 3 while the friction unit 3 is attached to the attachment hole 2, and thus facilitates the attachment operation.

3.6 Hardness and Viscosity of Friction Unit

The material constituting the friction unit 3 is preferably an elastic synthetic resin (rubber, elastomer) and examples include silicone resins, SBS resins (styrene-butadiene-styrene copolymers), SEBS resins (styrene-ethylene-butylene-styrene copolymers), fluororesins, chloroprene resins, nitrile resins, polyester-based resins, ethylene-propylene-diene rubber (EPDM), and the like.

The friction unit 3 in the present embodiment has a hardness less than that of a conventional friction unit to physically erase the metallic luster pigment added to the thermochromic ink described later from the paper surface. The friction unit 3 with the lower hardness is capable of entering indentation of the handwriting formed in the paper surface.

The hardness of the material for the friction unit 3 is expressed by, for example, a value of Shore A hardness measured in accordance with "Testing Methods for Durometer Hardness of Plastics" defined in JIS K 7215-1986 of Japan Industrial Standard. The durometer used for measuring the Shore A hardness is provided with an indenter biased by a spring and indicates the amount of indentation of the indenter against a measured object as a value of Shore A hardness. A smaller value of the Shore A hardness indicates that the measured object is softer, and a larger value of the Shore A hardness indicates that the measured object is harder.

The value of the Shore A hardness of the material for the friction unit 3 measured by the testing method in accordance with JIS K 7215-1986 preferably satisfies the following conditions i) and ii):

i) The value of the Shore A hardness immediately after starting contact with the indenter is 60 or more and 85 or less; and ii) The value $\Delta HS$ defined by the following equation is 0 or more and less than 5, $$\Delta HS = (\text{Shore } A \text{ Hardness Value immediately after Starting Contact with Indenter}) - (\text{Shore } A \text{ Hardness Value 15 seconds after Starting Contact with Indenter}).$$

It should be noted that "immediately after starting contact with the indenter" in i) and ii) above means a time within 1 second after contacting the measured object with the indenter.

The value of the Shore A hardness immediately after starting contact with the indenter in i) above is preferably 60 or more and 80 or less and more preferably 65 or more and 75 or less. The friction unit 3 containing the material satisfying the condition i) above increases the efficiency of frictional heat generation compared with conventional friction units. The friction unit 3 is thus capable of causing the handwriting in the thermochromic ink to readily undergo a thermochromic change. In addition, the friction unit 3 containing the material satisfying the condition i) above is softer than a conventional friction unit and is capable of entering the indentation of the handwriting formed in the paper surface. Moreover, the material for the friction unit 3 satisfying $\Delta HS$ in ii) above allows the metallic luster pigments to be adsorbed and separated from the indentation of the handwriting.

The value $\Delta HS$ in ii) above indicates the relaxation time for stress relaxation (temporal change in stress) when a certain strain is applied to the material for the friction unit 3. The time for stress relaxation is an indicator for classification of the material into an elastic material, a viscoelastic material, or a viscous material. The material for the friction unit 3 satisfying the value ΔHS in ii) above is considered as an elastic material provided with suitable viscosity for allowing adsorption of the metallic luster pigment. Meanwhile, the material with the value ΔHS of 5 or more is considered as a viscous material or a viscoelastic material. If the friction unit 3 is a viscous material or a viscoelastic material, the amount of deformation during abrasion of the handwriting in the thermochromic ink is too large and sufficient friction performance is not obtained. In particular, the friction unit 3 containing the synthetic resin has a modulus of elasticity depending on the temperature. This causes the friction unit 3 to deform more greatly when the temperature of the friction unit 3 itself increases by frictional heat and when the friction unit 3 is used in a high temperature environment. Accordingly, the value ΔHS of the material for the friction unit 3 is preferably 0 or more and less than 5. The value ΔHS in ii) above may be arbitrarily set by the type and/or composition of one or a plurality of comonomers contained in the polymeric material.

It should be noted that the values of the Shore A hardness in i) and ii) above may be values of Shore A hardness converted from values of Shore D hardness of the material for the friction unit 3 measured by a testing method in accordance with JIS K 7215-1986.

3.7 Amount of Wear of Friction Unit

In order to physically erase the metallic luster pigment added to the thermochromic ink from the paper surface, the friction unit 3 is preferably scraped by friction on the paper surface and preferably generates a small amount of wear crumbs (eraser crumbs). The friction unit 3 wears itself while adhering the metallic luster pigment to the wear crumbs and enclosing them, thereby removing the metallic luster pigment from the paper surface.

The amount of wear of the friction unit 3 is expressed by, for example, tensile strength Tb at break and elongation Eb at break calculated in accordance with "Rubber, vulcanized or thermoplastic—Determination of tensile stress-strain properties" defined in JIS K 6251: 2017 of Japan Industrial Standard. The tensile strength Tb at break is a value obtained by dividing the tensile force recorded when the measured object is broken by the cross section of the measured object before testing. The elongation Eb at break is an elongation when the measured object is broken and expressed in a percentage (%) based on the length of the measured object before testing.

The present inventor has found that the amount of wear of the friction unit 3 is inversely proportional to the value Tb×Eb. That is, the amount of wear of the friction unit 3 is influenced by the mechanical strength and the elongation percentage of the material. Appropriate combination of the values of the tensile strength Tb at break and the elongation Eb at break allows control of the amount of wear of the friction unit 3. The value Tb×Eb represents the amount of energy for wearing the friction unit 3. Accordingly, the value Tb×Eb is smaller when the measured object is more prone to be worn, and the value is larger when the measured object is less likely to be worn.

The value Tb×Eb of the material for the friction unit 3 calculated by the method in accordance with JIS K 6251: 2017 preferably satisfies the following condition iii), iii) 5,000≤Tb×Eb≤18,000.

It should be noted that, in iii) above, the unit of the tensile strength Tb at break is "MPa" and the unit of the elongation Eb at break is "%" while they may be converted to other units.

In iii) above, it is preferred that 8,000≤Tb×Eb≤16,000 and more preferred that 10,000≤Tb×Eb≤14,000. The material for the friction unit 3 satisfying the condition iii) above generates an appropriate amount of wear crumbs by normal friction operation with a human hand. This allows the metallic luster pigment added to the thermochromic ink to be adhered to the wear crumbs to be enclosed in the crumbs.

In iii) above, if the value Tb×Eb is more than 18000, it is difficult to wear the friction unit 3 by normal friction operation with a human hand. Thus, it is not possible to wear the friction unit 3 while adhering the metallic luster pigment to the wear crumbs and enclosing them.

Meanwhile, in iii) above, if the value Tb×Eb is less than 5000, the friction unit 3 turns out to be readily scraped by normal friction operation with a human hand. This causes loss of the frictional heat generated with the friction unit 3 together with the wear crumbs and it is thus difficult to cause the thermochromic ink to efficiently undergo a thermochromic change.

4. Inner Core

The inner core 7 is formed with a synthetic resin harder than the friction unit 3 or metal. The material constituting the inner core 7 will be described later. The inner core 7 in the present embodiment is a small columnar component with an outer diameter substantially identical to the inner diameter of the internal hole 31. The inner core 7 thus configured is inserted into the internal hole 31 of the friction unit 3. The inner core 7 with an outer circumferential surface contacting the circumferential surface of the internal hole 31 causes the friction unit 3 to be firmly fixed to the attachment hole 2 of the barrel 1. This allows an increase in the rigidity of the entire friction portion 32 and inhibition of deformation of the friction portion 32. As a result, it is possible to exhibit good friction performance even when the hardness of the material for the friction unit 3 is reduced.

The outer circumferential surface of the inner core 7 contacting the inner circumferential surface of the internal hole 31 causes an increase in the rigidity of the outward projection 51 provided in the attachment portion 5 of the friction unit 3 to inhibit inward deformation of the outward projection 51. The outward projection 51 and the inward projection 21 are thus firmly locked to prevent the friction unit 3 from falling out of the attachment hole 2.

Moreover, the outer circumferential surface of the inner core 7 preferably pressure fits, not simply contacts, the inner circumferential surface of the internal hole 31. To pressure fit the outer circumferential surface of the inner core 7 to the inner circumferential surface of the internal hole 31, the inner core 7 may have an outer diameter with the size not less than the inner diameter of the internal hole 31. The outer circumferential surface of the inner core 7 pressure fitting the inner circumferential surface of the internal hole 31 causes a greater increase in the rigidity of the friction portion 32 and the outward projection 51 to more securely prevent the inner core 7 from falling out of the friction unit 3.

The term "rigidity" regarding the friction portion 32 means the deformation resistance of the friction portion 32 to an external force and includes tensile stiffness, compression stiffness, flexural rigidity, shear stiffness, torsional rigidity, and the like. The external force is a force mainly applied to the friction portion 32 during friction operation. The friction portion 32 preferably has the rigidity to the extent not to buckle by the external force during friction operation.

4.1 Material for Inner Core

The inner core 7 is formed with a synthetic resin harder than the friction unit 3 or metal. Examples of the synthetic resin allowed to be used include polypropylene, polyethylene, polystyrene, polycarbonate, polyethylene terephthalate, polyacetal, acryl, nylon, acrylonitrile-styrene copolymer resins (AS resins), acrylonitrile-butadiene-styrene copolymer resins (ABS resins), and the like. It is also allowed to use rubber or an elastomer harder than the friction unit 3. Examples of the rubber or the elastomer allowed to be used include silicone resins, SBS resins (styrene-butadiene-styrene copolymers), SEBS resins (styrene-ethylene-butylene-styrene copolymers), fluororesins, chloroprene resins, nitrile resins, polyester-based resins, and ethylene-propylene-diene rubber (EPDM). The inner core 7 made of such a synthetic resin may be produced by, for example, machining or injection molding. Moreover, examples of the metal allowed to be used include aluminum alloy, stainless steel, brass, and the like. Meanwhile, the inner core 7 made of such a metal may be produced by, for example, machining or plastic processing.

4.2 Shape of Inner Core

Figure 4:
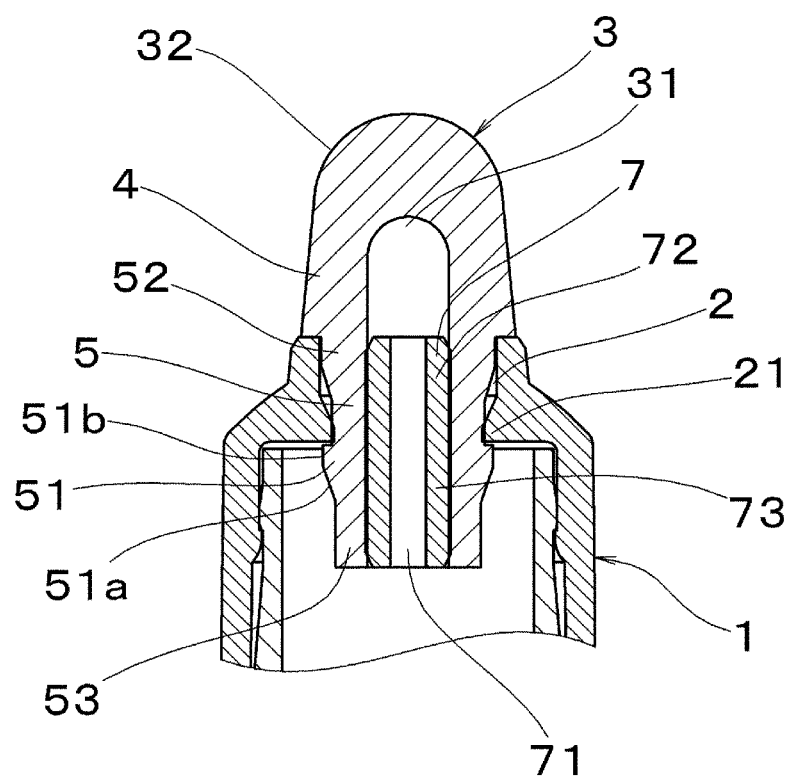
FIG. 4 is a cross-sectional view illustrating a state where an inner core is inserted into an internal hole of the friction unit.

As illustrated in FIG. 4, the inner core 7 preferably has a vertically symmetrical shape about the laterally central axis. The inner core 7 in the vertically symmetrical shape eliminates the difference between the top and the bottom of the inner core 7 and allows insertion into the internal hole 31 of the inner core 7 from either the top or the bottom. In contrast, the inner core 7 may have a vertically asymmetrical shape. For example, the inner core 7 may be chamfered at least in an edge portion at the upper end to facilitate insertion into the internal hole 31.

4.3 Vent Portion

The internal hole 31 in the present embodiment is a hole with one closed end, the hole opening at the lower end of the attachment portion 5 and not opening at the upper end of the friction portion 32. Meanwhile, the inner core 7 is a small columnar component with an outer diameter not less than the inner diameter of the internal hole 31. When the inner core 7 thus configured is inserted into the internal hole 31 with one closed end, air in the internal hole 31 is compressed by the inner core 7 and the inner core 7 sometimes cannot be smoothly inserted into the internal hole 31. To cope with such a situation, the inner core 7 is provided with a vent portion 71. The vent portion 71 in the present embodiment is a through hole penetrating the inner core 7 from an end to the other end along the longitudinal central axis of the inner core 7. In the process of inserting the inner core 7 into the internal hole 31, the air in the internal hole 31 passes through the vent portion 71 to be discharged to the outside. The vent portion 71 thus configured facilitates the operation of inserting the inner core 7 into the internal hole 31 and allows an automatic assembling machine to perform the operation of inserting the inner core 7.

It should be noted that the vent portion 71 is not limited to the configuration illustrated in FIG. 4. For example, the cross-sectional shape of the vent portion 71 is not limited to a circular shape and may be in a shape other than a circle. In addition, the vent portion 71 may be provided in a position shifted from the central axis of the inner core 7. Moreover, the vent portion 71 is not limited to the through hole and may be, for example, at least one groove or projection provided on the outer circumferential surface of the inner core 7. As another example, the vent portion 71 may be a spiral groove or projection provided along the outer circumferential surface of the inner core 7. The spiral groove or projection exhibits an anti-slip effect to prevent the inner core 7 from falling out of the internal hole 31. Moreover, instead of providing the inner core 7 with the vent portion 71, the groove or projection described above may be provided on the inner circumferential surface of the internal hole 31.

4.4 Upper Core Portion and Lower Core Portion

In the present embodiment, the upper half of the inner core 7 is referred to as an upper core portion 72 and the lower half of the inner core 7 is referred to as a lower core portion 73. As already described, the inner core 7 has a columnar shape with a constant outer diameter along the entire length. The inner core 7, however, may have a tapered shape in which the lower core portion 73 has an outer diameter greater than the outer diameter of the upper core portion 72. This facilitates the insertion of the inner core 7 into the internal hole 31. In addition, the larger outer diameter of the lower core portion 73 causes an increase in the rigidity of the outward projection 51 and inhibition of inward deformation of the outward projection 51. The outward projection 51 and the inward projection 21 are thus firmly locked to prevent the friction unit 3 from falling out.

4.5 Holding of Inner Core

To prevent the inner core 7 inserted into the internal hole 31 from readily slipping out, the inner core 7 may be provided with an anti-slip structure on the outer circumferential surface. As the anti-slip structure, for example, the outer circumferential surface of the inner core 7 may be treated as a rough surface to increase the frictional resistance against the inner circumferential surface of the internal hole 31. As another example of the anti-slip structure, a small projection may be provided on the outer circumferential surface of the inner core 7. Moreover, the outer diameter of the inner core 7 may be markedly larger than the inner diameter of the internal hole 31 to prevent the inner core 7 from readily slipping out of the internal hole 31.

5. Method of Attaching Friction Unit

With reference to FIGS. 1 through 4, a method of attaching the friction unit 3 according to the present embodiment will then be described.

As illustrated in FIG. 1, the friction unit 3 is arranged above the attachment hole 2 at the rear end portion of the barrel 1 and then directly dropped into the attachment hole 2. Then, as illustrated in FIG. 2, the cylindrical portion 53 of the attachment portion 5 enters the minimum inner diameter portion 21b of the attachment hole 2 to cause the attachment portion 5 to be in the provisional insertion state to the attachment hole 2. In this situation, the guide surface 51a of the attachment portion 5 abuts on the guide surface 21a of the attachment hole 2 to stably keep the provisional insertion state of the attachment portion 5.

The friction unit 3 in the provisional insertion state is then pressed into the attachment hole 2. During this operation, the outward projection 51 of the attachment portion 5 rides over the inward projection 21 of the attachment hole 2. In this situation, the outward projection 51 is firmly pressure fitted to the inward projection 21, causing the intermediate portion of the attachment portion 5 to be elastically deformed and bulge radially outside. The intermediate portion of the attachment portion 5 bulging radially outside is stored in the annular space 6 of the attachment hole 2. The intermediate portion of the attachment portion 5 thus does not pressure fit the inner circumferential surface around the entrance of the attachment hole 2 and does not inhibit insertion of the attachment portion 5. Accordingly, the outward projection 51 smoothly passes through the inward projection 21 to lock the outward projection 51 to the inward projection 21. The insertion of the attachment portion 5 into the attachment hole 2 is thus completed (refer to FIG. 3).

As illustrated in FIG. 4, the inner core 7 is then inserted into the internal hole 31 of the friction unit 3. In the process of inserting the inner core 7 into the internal hole 31, the air in the internal hole 31 is discharged to the outside passing through the vent portion 71. The vent portion 71 thus configured allows the inner core 7 to be readily inserted into the internal hole 31. The inner core 7 inserted into the internal hole 31 presses the attachment portion 5 outward to cause the locking between the outward projection 51 and the inward projection 21 to be firm. The attachment of the friction unit 3 to the rear end portion of the barrel 1 is thus completed.

Such a method of attaching the friction unit 3 in the present embodiment allows insertion of the flexible attachment portion 5 into the attachment hole 2, before inserting the inner core 7 into the internal hole 31, to readily lock the outward projection 51 to the inward projection 21. The inner core 7 is then inserted into the internal hole 31, causing the forces in the directions inside and outside to act on the attachment portion 5 and the locking between the outward projection 51 and the inward projection 21 to be firmly maintained. In addition, the inner core 7 is inserted into the internal hole 31 after inserting the attachment portion 5 into the attachment hole 2 and thus the attachment of the friction unit 3 illustrated in FIGS. 1 through 4 does not have to be operated with a large force.

6. Thermochromic Ink

The thermochromic ink contained in the thermochromic writing instrument in the present embodiment may be any of water-based ink, oil-based ink, or gel ink as long as the ink is capable of forming thermochromic handwriting. In addition, the form of the thermochromic ink is not limited to liquid and may be solid, such as a pencil core, for example. The thermochromic ink will be detailed below.

The applicable thermochromic ink contained in the thermochromic writing instrument is capable of changing or removing the color by heating. As a colorant to be added to the thermochromic ink, it is preferred to use a reversible thermochromic composition containing an electron-donating organic coloring compound, an electron accepting compound, and a reaction medium to determine the induction temperature for the coloration reaction of these compounds. In particular, it is more preferred to use microcapsule pigments configured to contain the reversible thermochromic composition in microcapsules.

A first reversible thermochromic composition includes those described in, for example, JP S51-44706 (B2), JP S51-44707 (B2), and JP H01-29398 (B2). The reversible thermochromic compositions described in these patent gazettes in Japan have a point of color change on each side of a higher temperature and a lower temperature. The point of color change refers to a predetermined temperature as the boundary to bring a change of color. The first reversible thermochromic composition is in a color-removal state in a temperature range not less than the point of color change on the higher temperature side and is in a color-development state in a temperature range not more than the point of color change on the lower temperature side. In an ordinary temperature range, either one state of the color-removal state or the color-development state is maintained. The other state is maintained only while the temperature reaches the point of color change on the higher temperature side or the lower temperature side. When the temperature leaves the range of the point of color change on the higher temperature side or on the lower temperature side, the color returns to the state before the change. In other words, the first reversible thermochromic composition has a relatively small width ΔH of the hysteresis properties (e.g., ΔH is 1° C. or more and 7° C. or less).

A second reversible thermochromic composition includes reversible thermochromic compositions described in, for example, JP H04-17154 (B2), JP H07-179777 (A), JP H07-33997 (A), JP H08-39936 (A), JP 2006-137886 (A), JP 2006-188660 (A), JP 2008-45062 (A), and JP 2008-280523 (A) where the compositions have a larger width ΔH of the hysteresis properties (e.g., ΔH is 8° C. or more and 50° C. or less).

The size of the width ΔH of the hysteresis properties is represented by the shape of a curve obtained by plotting the color density of the reversible thermochromic composition at the temperatures. For example, the assumption is made that the reversible thermochromic composition is in a full color-removal state in the temperature range not less than the point of color change on the higher temperature side and is in a full color-development state in the temperature range not more than the point of color change on the lower temperature side. The temperature turning to the full color-removal state is referred to as a "full color-removal temperature" and the temperature turning to the full color-development state as a "full color-development temperature". In the curve obtained by plotting the color density of this reversible thermochromic composition at the temperatures, a large difference between the route of the curve from the full color-removal temperature on the lower temperature side to the full color-development temperature on the higher temperature side and the route of the curve from the full color-development temperature on the higher temperature side to the full color-removal temperature on the lower temperature side indicates a large width ΔH of the hysteresis properties. Moreover, such a reversible thermochromic composition has color memory properties to maintain the color-development state or the color-removal state in a specific temperature range, for example, in the ordinary temperature range (daily life temperature range).

The reversible thermochromic composition having the color memory properties preferably has a full color-development temperature set at a low temperature outside the ordinary temperature range and a full color-removal temperature set at a temperature of the frictional heat allowed to be generated by the friction unit. The full color-development temperature is in a range of, for example, −50° C. or more and 0° C. or less, preferably −40° C. or more and −5° C. or less, and more preferably −30° C. or more and −10° C. or less. Meanwhile, the full color-removal temperature is in a range of, for example, 50° C. or more and 95° C. or less, preferably 50° C. or more and 90° C. or less, and more preferably 60° C. or more and 80° C. or less. In addition, the width ΔH of the hysteresis properties is set between 40° C. or more and 100° C. or less to maintain the color-development state or the color-removal state well in the ordinary temperature range.

The reversible thermochromic composition described above is contained in microcapsules to produce a microcapsule pigment allowing removal of the color by heating. The microcapsule pigment has an average particle diameter ranging, for example, from 0.05 μm or more to 5.0 μm or less, preferably from 0.1 μm or more to 4.0 μm or less, and more preferably from 0.5 μm or more to 3.0 μm or less. Thus, good writing performance and handwriting concentration of the thermochromic writing instrument are achieved. Moreover, the microcapsule pigment having an average particle diameter of 2.0 μm or more allows handwriting in the thermochromic ink not only to chemically remove the color but also to be physically erased from the paper surface. That is, the microcapsule pigment having an average particle diameter of 2.0 μm or more is adsorbed by the friction unit to be physically separated from the paper surface and irreversibly erased.

It should be noted that the average particle diameter of the microcapsule pigment is measured using image analyzing particle size distribution measurement software "Mac-View" produced by Mountech Co., Ltd. At first, a region of the particles of the microcapsule pigment is specified, and then a projected area diameter (Heywood diameter) is calculated from the area of the region of the particles, followed by measuring an average particle diameter of volume equivalent particles using the value of the projected area diameter.

When all or most of the particle diameters of the microcapsule pigment included in the thermochromic ink are more than 0.2 μm, the measurement may be performed using a particle size distribution measurement device "Multisizer® 4e" manufactured by Beckman Coulter K.K. In this case, the volume equivalent diameter of the microcapsule pigment is measured by the Coulter method to obtain the average particle diameter based on the measured values.

Further, as coloring components, non-thermochromic general dyes and pigments may be added. This allows the handwriting in thermochromic ink to be provided with a desired non-thermochromic color. Examples of the general dye allowed to be used include acid dyes, basic dyes, direct dyes, and the like. Examples of the general pigment allowed to be used include dispersed pigment products finely and stably dispersed in a medium in advance using a surfactant in addition to inorganic pigments, such as carbon black and ultramarine, and organic pigments, such as copper phthalocyanine blue and benzidine yellow. Still in addition, it is also possible to use metallic luster pigments, such as metal powders and pearl pigments, fluorescent pigments, phosphorescent pigments, and special pigments, such as titanium dioxide. It should be noted that these coloring components may be used together with the microcapsule pigment described above or may be contained in the microcapsule pigment.

6.1 Metallic Luster Pigment

A metallic luster pigment is added to the thermochromic ink to give metallic luster to the thermochromic ink and form lustrous handwriting. A transparent metallic luster pigment is preferably added to the thermochromic ink. The transparent metallic luster pigment provides handwriting in the thermochromic ink with lustrous properties and also causes the handwriting in the thermochromic ink, when chemically erased, to be visually sensed as being fully erased without the lustrous properties.

Examples of the transparent metallic luster pigments allowed to be used include: luster pigments having a core material coated with metal oxide; and cholesteric liquid crystal luster pigments. Examples of the core material allowed to be used include a material selected from natural mica, synthetic mica, flat glass pieces, thin aluminum oxide flakes, and the like.

Effective examples of the luster pigment having natural mica as the core material include those having a surface coated with titanium oxide and those having the surface coating of the titanium oxide layer overcoated with iron oxide or a non-thermochromic pigment. Examples of the luster pigment having natural mica as the core material allowed to be used include pigments under the trade name of "Iriodin®" produced by Merck KGaA and pigments under the trade name of "Lumina®" produced by BASF SE.

Effective examples of the luster pigment having synthetic mica as the core material include those having a surface coated with metal oxide, such as titanium oxide. For example, it is possible to use oxide of metals, such as titanium, zirconium, chromium, vanadium, and iron, and metal oxide containing titanium oxide as a main component is preferred. Examples of the luster pigment having synthetic mica as the core material allowed to be used include pigments under the trade name of "ULTIMICA®" produced by Nihon Koken Kogyo Co., Ltd.

Effective examples of the luster pigment having flat glass pieces as the core material include those having a surface coated with metal oxide, such as titanium oxide. Examples of the luster pigment having flat glass pieces as the core material allowed to be used include pigments under the trade name of "METASHINE®" produced by Nippon Sheet Glass Co., Ltd.

Effective examples of the luster pigment having thin aluminum oxide flakes as the core material include those having a surface coated with metal oxide, such as titanium oxide. Examples of the metal oxide allowed to be used include oxide of metals, such as titanium, zirconium, chromium, vanadium, and iron, and metal oxide containing titanium oxide as a main component is preferred. Examples of the luster pigment having thin aluminum oxide flakes as the core material allowed to be used include pigments under the trade name of "Xirallic®" produced by Merck KGaA.

The liquid crystal polymer used as the cholesteric liquid crystal luster pigment has properties, due to the interference effect of light, to reflect light in some spectrum range of light incident in a wide spectrum range and transmit all the light in the other spectrum range. The cholesteric liquid crystal luster pigment has excellent metallic luster, color flop properties to change the hue depending on the visual angle, and transparency. Examples of the cholesteric liquid crystal luster pigment allowed to be used include pigments under the trade name of "Helicone® HC" produced by Wacker Chemie AG.

It is also possible to use a lustrous material produced by vacuum deposition. The lustrous material is produced by vacuum depositing metal, such as gold and silver, on a film to form foil and then separating the foil from the film to be finely ground. Examples of such a lustrous material allowed to be used include pigments under the trade name of "ELgee Neo®" produced by Oike & Co., Ltd.

The metallic luster pigment described above has an average particle diameter ranging from 0.1 μm or more to 50 μm or less, preferably from 2 μm or more to 40 μm or less, and more preferably from 10 μm or more to 40 μm or less. Thus, good writing performance and handwriting brightness of the thermochromic writing instrument are achieved. It should be noted that the average particle diameter of the metallic luster pigment is obtained by, for example, measuring a particle diameter distribution using a particle size distribution analyzer "LA-300" manufactured by HORIBA, Ltd. and calculating a volume-based average particle diameter (median diameter) based on the measured value of the particle diameter distribution.

6.2 Physical Erasure of Metallic Luster Pigment

The metallic luster pigment is less likely to penetrate a paper surface. Accordingly, abrasion of handwriting in the thermochromic ink including the metallic luster pigment added thereto causes the metallic luster pigment to be scattered on the paper surface and results in poor appearance after erasing the handwriting. In particular, the luster of the metallic luster pigment is emphasized on black paper and causes poorer appearance after erasing the handwriting.

To cope with such a situation, the material for the friction unit 3 in the present embodiment satisfies the condition i) above where the value of the Shore A hardness immediately after starting contact with the indenter is 60 or more and 85 or less. This allows the friction unit 3 to enter the indentation of the handwriting formed in the paper surface. In addition, the material for the friction unit 3 in the present embodiment satisfies the condition ii) above where the value ΔHS is 0 or more and less than 5. This allows the friction unit 3 to adsorb and separate the metallic luster pigment from the indentation of the handwriting. That is, the friction unit 3 in the present embodiment is capable of physically erasing the metallic luster pigment added to the thermochromic ink without scattering them on the paper surface. The handwriting in the thermochromic ink is also chemically erased by frictional heat.

Moreover, in the case of the metallic luster pigment added to the thermochromic ink, the metallic luster pigment has a volume Vp and the friction portion 32 has a volume Ve, the volume Ve and the volume Vp preferably satisfying the following condition iv), iv) $5 \leq Ve/Vp \leq 35$.

The volume Vp of the metallic luster pigment indicates the amount of the metallic luster pigment providing the handwriting with lustrous properties. The volume Ve of the friction portion 32 indicates the amount of the friction portion 32 to physically erase the metallic luster pigment by wearing. The value Ve/Vp in the range of 5 or more and 35 or less keeps the balance between the amount of the metallic luster pigment added to the thermochromic ink and the amount of the friction portion 32 for erasing the amount of the added metallic luster pigment. That is, Ve/Vp of 35 as the upper limit indicates that the minimum amount of the metallic luster pigment is added to provide the handwriting with visually sensed lustrous properties. In this case, the friction portion 32 is in the maximum amount capable of erasing 100% of the minimum amount of the metallic luster pigment. In contrast, Ve/Vp of 5 as the lower limit indicates that the maximum amount of the metallic luster pigment is added to provide the handwriting with higher lustrous properties. In this case, the friction portion 32 is in the minimum amount capable of erasing 30% of the maximum amount of the metallic luster pigment. The value Ve/Vp is preferably 8 or more and 26 or less and more preferably 10 or more and 20 or less.

6.3 Other Additives

The thermochromic ink may contain conventionally known various additives added thereto. In the case of water based thermochromic ink, for example, pH regulators, anticorrosives, antiseptics, mildewcides, wetting agents, defoamers, surfactants, lubricants, fixers, such as resin, shear thinners, pen point anti-drying agents, anti-sagging agents, and the like may be added. In the case of oil based thermochromic ink, for example, viscosity regulators, antiseptics, anticorrosives, defoamers, lubricants, dispersants, antifading agents, antileak agents, surfactants, and the like may be added.

7. Thermochromic Writing Instrument

The type of thermochromic writing instrument in the present embodiment is not particularly limited and may be any of, for example, fountain pens, markers, ball-point pens, solid paint instruments with a twisting core extension mechanism, and the like. The thermochromic writing instrument may be configured as an instrument with a cap or a retractable instrument. The thermochromic writing instrument with a cap is provided with a cap to cover the pen point (tip). The retractable thermochromic writing instrument is provided with a retractable mechanism configured to allow the pen point to be in a state where the pen point projects from the barrel and in a retracted state where the pen point is stored in the barrel. The retractable mechanism may be any of, for example, a push mechanism, a twist mechanism, a slide mechanism, and the like. Moreover, the retractable thermochromic writing instrument may be configured to include two or more refills and allow any one of the two or more refills to be in a selectively projected state. In this case, the two or more refills may be configured to have the pen points of different types from each other and/or the thermochromic ink of different colors from each other.

The markers may have any pen point of, for example, a fiber tip, a felt tip, a plastic tip, a metal tip, and the like. Such a marker may have an ink absorber of a fiber bundle impregnated with the thermochromic ink. The ink absorber is stored in the barrel. The thermochromic ink impregnated into the ink absorber is supplied to the pen point. The thermochromic ink used for the markers may be directly stored in the barrel. In this case, the barrel is provided with an ink flow adjuster of comb grooves or a fiber bundle. The thermochromic ink directly stored in the barrel is supplied to the pen point via the ink flow adjuster. The barrel may be provided with, instead of the ink flow adjuster, a valve mechanism to supply a predetermined amount of ink to the pen point.

The thermochromic ink used for the ball-point pens is filled to, for example, an ink storage tube with a ball-point pen tip mounted at the distal end. In this case, at the rear end of the thermochromic ink in the ink storage tube, an ink backflow check material is arranged. The thermochromic ink used for the ball-point pens may be directly stored in the barrel. In this case, at the rear end of the thermochromic ink in the barrel, an ink backflow check material is arranged. Moreover, such a ball-point pen may have an ink absorber of a fiber bundle impregnated with the thermochromic ink. The barrel may be provided with an ink flow adjuster of comb grooves or a fiber bundle. Via the ink flow adjuster, a predetermined amount of the thermochromic ink is supplied to the pen point.

Figure 5:
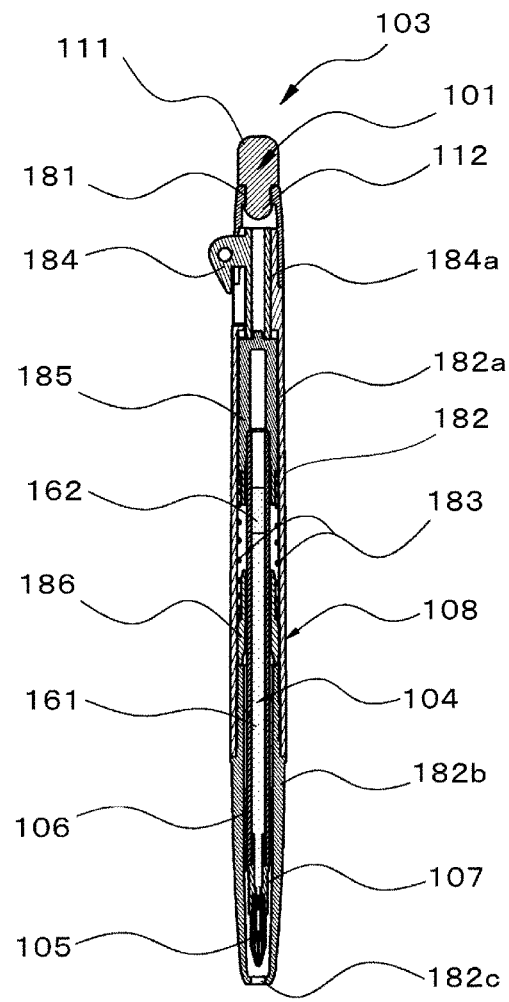
FIG. 5 is a cross-sectional view illustrating a thermochromic writing instrument according to a second embodiment of the present invention.

In the various types of thermochromic writing instrument described above, the friction unit 3 in the present embodiment is attached to any component configuring the thermochromic writing instrument to be integrated with the thermochromic writing instrument (refer to FIG. 5). For example, the friction unit 3 is attached to a cap, a clip, a top crown, an end fitting, a barrel, a breech, a grip, an operating portion to retract the pen point, and the like configuring the thermochromic writing instrument. The friction portion 32 may be configured to be covered with an anti-smudging cover.

Figure 6:
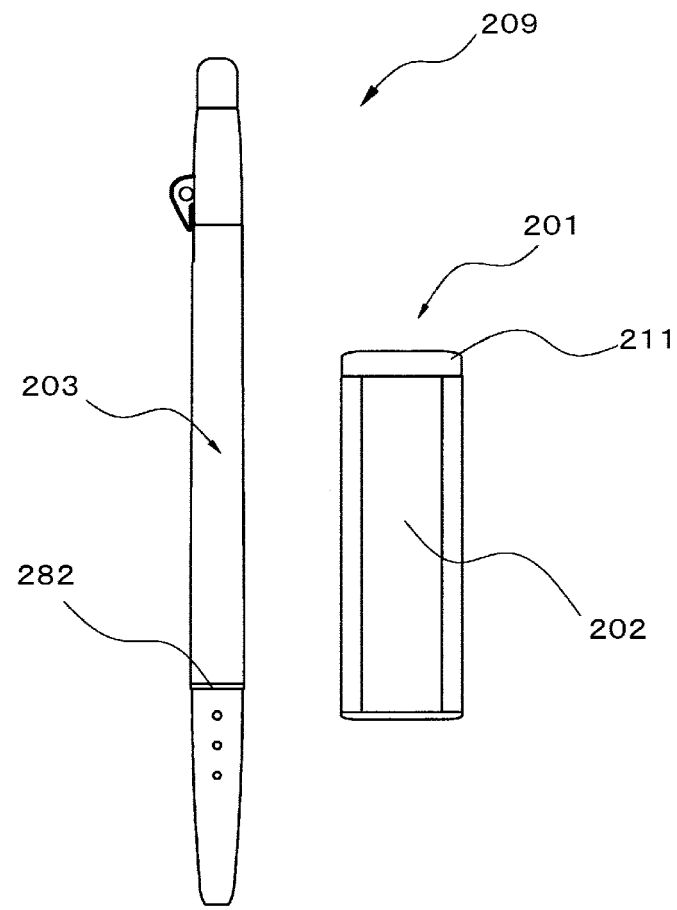
FIG. 6 is an external view illustrating a writing set configured with a thermochromic writing instrument and a friction unit according to a third embodiment of the present invention.

It should be noted that the friction unit 3 in the present embodiment may be an article separated from the thermochromic writing instrument, not attached to any component configuring the thermochromic writing instrument (refer to FIG. 6). The separated friction unit 3 may be configured to be formed only by the synthetic resin material with low hardness described above. The separated friction unit 3 may be configured to be attached to another component formed with a material with high hardness.

8. Action and Effects

The friction unit 3 in the present embodiment is capable of, similar to conventional friction units, changing or removing the color of handwriting in the thermochromic ink by generating frictional heat. In addition, the friction portion 32 with low hardness enters the indentation of the handwriting and adsorbs the metallic luster pigment added to the thermochromic ink to separate the pigment from the paper surface. The metallic luster pigment adsorbed by the friction portion 32 is caught in the wear crumbs of the friction portion 32 and fully removed the from the paper surface. The friction unit 3 in the present embodiment is thus capable of chemically and physically erasing handwriting in the thermochromic ink including the metallic luster pigment added thereto.

Use of the friction unit 3 in the present embodiment allows the handwriting in the thermochromic ink including the metallic luster pigment added thereto to be erased without leaving the color. Accordingly, the paper surface after erasing the handwriting has a good appearance. In particular, the metallic luster pigment having an average particle diameter of 10 μm or more is capable of providing handwriting in the thermochromic ink with higher lustrous properties and is also readily adsorbed by the friction portion 32.

It should be noted that conventional friction units have too large values of Shore A hardness and thus are not capable of erasing handwriting with a pencil core. The handwriting by a pencil core has to be erased using a regular eraser having a small value of Shore A hardness. In contrast, the friction unit 3 in the present embodiment has a smaller value of Shore A hardness than the value of a conventional friction unit. The friction unit 3 has properties, similar to the regular eraser, to be scraped by friction on the paper surface to generate a small amount of wear crumbs. Accordingly, it is possible to erase both the handwriting in the thermochromic ink and the handwriting by a pencil core using the one friction unit 3.

It should be noted that the friction unit 3 in the present embodiment may be an article separated from the thermochromic writing instrument (refer to friction unit 201 in FIG. 6). The friction unit 3 separated from the thermochromic writing instrument is preferably attached to a support for holding with fingers. The support is formed with, for example, a harder synthetic resin or metal. The friction unit 3 separated from the thermochromic writing instrument is combined with the thermochromic writing instrument to configure one writing set.

EXAMPLES

Examples of the thermochromic writing instrument of the present invention are described below with reference to FIGS. 5 and 6. It should be noted that, in First and Second Examples described below, a value indicating the content of each composition is in parts by mass. The average particle diameter of each thermochromic pigment was measured using a particle size distribution measurement device "Multisizer® 4e" manufactured by Beckman Coulter K.K. The volume equivalent diameter of the thermochromic pigment was measured by the Coulter method to calculate the average particle diameter from the measured values. The average particle diameter of the metallic luster pigment was measured using a particle size distribution analyzer "LA-300" manufactured by HORIBA, Ltd. The particle diameter distribution of the metallic luster pigment was measured to calculate the volume-based average particle diameter (median diameter) based on the measured value. The Shore A hardness of the material for each friction unit was measured by the testing method in accordance with JIS K 7215 of Japan Industrial Standard. A sample was prepared in a predetermined shape, thickness, and size using the same material as the friction unit. The sample was pressurized by a manual durometer to measure the Shore A hardness.

First Example

In First Example, a thermochromic writing instrument 103 of the second embodiment illustrated in FIG. 5 was used. The thermochromic writing instrument 103 has a barrel 182 with a friction unit 101 mounted at the rear end.

The friction unit 101 was formed with a polyester-based elastomer satisfying the conditions i) through iv). The polyester-based elastomer had a value of the Shore A hardness immediately after starting contact with the indenter of 70 and a value of the Shore A hardness 15 seconds after starting contact with the indenter of 69. Accordingly, the polyester-based elastomer had a value ΔHS of 1.

The tensile strength Tb at break and the elongation Eb at break of the polyester-based elastomer were measured by the testing method in accordance with JIS K 6251:2017. As a result of the measurement, the tensile strength Tb at break was 14 MPa and the elongation Eb at break was 890%. Accordingly, the polyester-based elastomer had a value Tb×Eb of 12460.

The polyester-based elastomer described above was injection molded to obtain the friction unit 101 in opal having the shape illustrated in FIG. 5. The friction unit 101 included a friction portion 111 in a convex curved surface shape and a columnar attachment portion 112. The attachment portion 112 had a stepwise locking portion formed at the lower end. The friction portion 111 in a convex curved surface shape stabilized the friction operation and facilitated the abrasion of handwriting on the paper surface.

The attachment portion 112 of the friction unit 101 was inserted into an attachment hole 181 provided at the rear end of the barrel 182. The attachment hole 181 had an inner circumferential surface on which two ring beads were formed. The attachment portion 112 was sandwiched between the two ring beads in the attachment hole 181. Moreover, the locking portion of the attachment portion 112 was locked to the lower end of the attachment hole 181. The friction portion 111 had a maximum outer diameter D of 6, and the attachment hole 181 also had a projection length L of 6. Accordingly, the value of L/D of the friction portion 111 was 1.

The thermochromic writing instrument 103 was a retractable ball-point pen. The thermochromic writing instrument 103 had a pen point (ball-point pen tip) 105 was in a projected state or in a retracted state by sliding an operating portion 184 forward. The operating portion 184 projected from a side of the barrel 182 to the outside. Inside the barrel 182, a retractable mechanism was stored to cause the pen point 105 to be projected and retracted. The retractable mechanism was mainly configured with a slide piece 184a, a refill retention portion 185, a coil spring 183, and a locking member 186. A refill 104 was stored in front of the refill retention portion 185 inside the barrel 182.

The barrel 182 was configured with a front barrel 182b and a rear barrel 182a. The distal end of the front barrel 182b was provided with an opening 182c. The opening 182c had a diameter allowing the pen point 105 of the refill 104 to be projected or retracted. The rear barrel 182a was screwed to the rear end portion of the front barrel 182b. Inside the rear barrel 182a, the retractable mechanism described above was stored. To store the slide piece 184a integrally formed with the operating portion 184 as a single member, the rear barrel 182a was configured with first and second components that were separable to the front and the rear. The second component configuring the rear portion of the rear barrel 182*a* had a longitudinally extending slide hole. When the slide piece 184*a* was stored inside the rear barrel 182*a*, the operating portion 184 projected from the slide hole to the outside.

The slide piece 184*a* was a substantially cylindrical resin molded article that was integrally formed with the operating portion 184 as a single member. At the distal end of the slide piece 184*a*, a plurality of sawtooth projections were formed. In front of the slide piece 184*a* in the rear barrel 182*a*, the refill retention portion 185 is arranged. The refill retention portion 185 was a substantially cylindrical resin molded article that fit to the rear end portion of the refill 104. At the rear end of the refill retention portion 185, a plurality of steps were formed. The plurality of steps engaged with the sawtooth projections of the slide piece 184*a*. The refill retention portion 185 had an outer circumferential surface with a plurality of axially extending ribs formed at regular intervals. Meanwhile, the first component configuring the front portion of the rear barrel 182*a* had an inner surface with a plurality of grooves formed at regular intervals. The plurality of grooves guided the plurality of ribs of the refill retention portion 185 in the axial direction.

The front end area of the refill retention portion 185 had a smaller outer diameter than that of the other area to be inserted into the rear end portion of the coil spring 183. The front end portion of the coil spring 183 was locked to the locking member 186 fixed to the rear barrel 182*a*. The coil spring 183 biased the refill retention portion 185 and the refill 104 rearward.

In the retracted state of the pen point 105, forward sliding of the operating portion 184 caused the plurality of ribs of the refill retention portion 185 to be guided to the plurality of grooves in the rear barrel 182*a*, thereby moving the refill retention portion 185 forward. After the plurality of ribs passed through the plurality of grooves, the sawtooth projections of the slide piece 184*a* engaged with the steps of the refill retention portion 185 to rotate the refill retention portion 185 by a predetermined angle. The end surfaces of the ribs thus abutted on the end surfaces of the grooves to fix the refill retention portion 185 in the state of having moved forward. As a result, the pen point 105 of the refill 104 was maintained in the state of projecting from the opening 182*c* of the front barrel 182*b*.

In the projected state of the pen point 105, forward sliding of the operating portion 184 caused the sawtooth projections of the slide piece 184*a* to be engaged with the steps of the refill retention portion 185, thereby rotating the refill retention portion 185 by a predetermined angle. This removed the abutment of the end surfaces of the ribs on the end surfaces of the grooves to guide the plurality of ribs of the refill retention portion 185 to the plurality of grooves in the rear barrel 182*a*. The refill retention portion 185 moved rearward by a biasing force of the coil spring 183. As a result, the pen point 105 of the refill 104 was in the state of being retracted into the opening 182*c* of the front barrel 182*b*.

The refill 104 was configured with the pen point 105, an ink storage tube 106, and a connecting member 107. The pen point 105 rotatably held a ball at the front end. The ink storage tube 106 was a metal pipe with openings at the front end and the rear end. The connecting member 107 was formed with a transparent synthetic resin. The pen point 105 was connected to the opening at the front end of the ink storage tube 106 via the connecting member 107. The refill 104 stored a thermochromic ink composition 161 and an ink follower composition 162 therein.

The thermochromic ink composition 161 contained the components of a reversible thermochromic pigment (11 parts), a transparent metallic luster pigment (3 parts), a metallized resin pigment (2 parts), a shear thinner (0.3 parts), urea (10 parts), glycerin (10 parts), a nonionic penetration agent (0.6 parts), a hydrophobic silica-based defoamer (0.1 parts), an antiseptic (0.1 parts), and water (62.9 parts).

The reversible thermochromic pigment was configured to contain a reversible thermochromic composition changing the color from being colored in pink to being colorless in microcapsules. The reversible thermochromic pigment had a color-development temperature of −10° C., a color-removal temperature of 65° C., and an average particle diameter of 2.5 µm.

As the transparent metallic luster pigment, a pigment under the trade name of "Iriodin® 6103 Icy White" produced by Merck KGaA was used. The transparent metallic luster pigment was formed from particles in silver color having a surface of synthetic mica coated with metal oxide. The transparent metallic luster pigment had an average particle diameter of 25 µm. As the metallized resin pigment, a pigment under the trade name of "ELgee Neo® Silver #325" produced by Oike & Co., Ltd. was used. The particles of the metallized resin pigment had silver color and an average particle diameter of 35 µm. The value of the ratio Ve/Vp of the volume Ve of the friction portion 111 to the total volume Vp of the transparent metallic luster pigment and the metallized resin pigment was 15.

As the shear thinner, xanthan gum was used. As the nonionic penetration agent, an agent under the trade name of "SN-WET 366" produced by San Nopco, Ltd. was used. As the hydrophobic silica-based defoamer, an agent under the trade name of "NOPCO 8034" produced by San Nopco, Ltd. was used. As the antiseptic, an agent under the trade name of "PROXEL® XL2" produced by LONZA K.K. was used.

The ink follower composition 162 contained the components of polybutene (98.5 parts) as a base oil and fatty amide (1.5 parts) as a thickener. A mixture prepared by adding fatty amide to polybutene was kneaded with a three-roll mill to obtain the ink follower composition 162.

Using the thermochromic writing instrument 103, handwriting in the thermochromic ink composition 161 was formed on a paper surface of "writing paper A" (chemical pulp 100%, brightness of 75.0 or more) in accordance with JIS P3201 of Japan Industrial Standard. The thermochromic pigment in pink color was the base of the handwriting, and the transparent metallic luster pigment and the metallized resin pigment in silver color were dispersed in the handwriting. As a result, the handwriting in the thermochromic ink composition 161 exhibited metallic pink color on a white paper surface. In addition, handwriting in the thermochromic ink composition 161 was formed on a black paper surface. As a result, the hue of the handwriting formed on the black paper surface was similar to the case of the white paper surface. However, the lustrous properties of the handwriting formed on the black paper surface was particularly higher than the case of the white paper surface.

The friction unit 101 attached to the thermochromic writing instrument 103 was capable of chemically and physically erasing the respective handwriting formed on the white and black paper surfaces. That is, the handwriting formed on each paper surface was repeatedly abraded with the friction portion 111. The friction portion 111 then generated frictional heat to cause the thermochromic pigment in the handwriting to change the color from being colored in pink to being colorless and transparent. In addition, the friction portion 111 with low hardness entered the indentation of the handwriting to adsorb and separate the transparent metallic luster pigment and the metallized resin pigment in silver color from the paper surface. Moreover, the transparent metallic luster pigment and the metallized resin pigment adsorbed by the friction portion 111 were enclosed in wear crumbs of the friction portion 111 to be fully removed from the paper surface. The friction unit 101 thus neatly erased the handwriting in the thermochromic ink composition 161 without smudging the paper surface. In particular, there used to be a problem that the metallic luster pigment and the metallized resin pigment remained on black paper were lustrous depending on the visual angle and visually recognized. This problem was solved by using the friction unit 101.

The Table 1 below shows the results of evaluation tests for each friction unit in Examples 1 through 4 and Comparative Examples 1 through 4. The friction units in Examples 1 through 4 satisfied both conditions regarding the Shore A hardness and Ve/Vp of the present invention. The friction units in Comparative Examples 1 through 4 did not satisfy either one of the conditions regarding the Shore A hardness and Ve/Vp of the present invention. Each friction unit in Examples 1 through 4 and Comparative Examples 1 through 4 had a shape identical to that of the friction unit 101 illustrated in FIG. 5 and were attached to the rear end of the barrel 182 of the thermochromic writing instrument 103. The refill 104 of the thermochromic writing instrument 103 stored the thermochromic ink composition 161 and the ink follower composition 162, both compositions containing the components described above. The pen point 105 of the refill 104 was a ball-point pen tip.

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Shore A Hardness | Immediately After | 70 | 74 | 76 | 78 | 70 | 90 | 88 | 50 |
|  | 15 Seconds After | 69 | 73 | 75 | 78 | 69 | 72 | 88 | 25 |
|  | ΔHS | 1 | 1 | 1 | 0 | 1 | 18 | 0 | 25 |
| Ve/Vp |  | 15 | 15 | 15 | 15 | 4 | 15 | 15 | 15 |
| Erasability | White Paper | A | A | A | A | A | A | C | B |
|  | Black Paper | A | A | A | A | A | A | C | C |
| Wear Crumbs |  | A | A | A | A | A | A | A | C |
| Continuous Erasability |  | A | A | A | A | A | C | A | A |
| Erasable Amount |  | A | A | A | A | C | A | A | C |

Any of the friction units in Examples 1 through 4 were formed from a polyester-based elastomer. The friction units in Examples 1 through 4 had different hardness from each other by mixing polyester-based elastomers with different hardness. All the friction units in Examples 1 through 4 satisfied the conditions of the present invention, in which the value of the Shore A hardness immediately after starting contact with the indenter was 60 or more and 85 or less, the value ΔHS was 0 or more and less than 5, and the value Ve/Vp was 5 or more and 35 or less.

The friction unit in Comparative Example 1 contained a polyester-based elastomer with the hardness identical to that in Example 1. The friction unit in Comparative Example 1 had a value Ve/Vp of 4. In this respect, the friction unit in Comparative Example 1 did not satisfy the condition of the present invention, in which the value Ve/Vp was 5 or more and 35 or less.

The friction unit in Comparative Example 2 contained 40% of an a-polyolefin copolymer, 40% of a styrene-based elastomer, and 20% of crystalline polypropylene. The friction unit in Comparative Example 2 had a value of the Shore A hardness immediately after starting contact with the indenter of 90 and a value ΔHS of 18. In these respects, the friction unit in Comparative Example 2 did not satisfy the conditions of the present invention, in which the value of the Shore A hardness immediately after starting contact with the indenter was 60 or more and 85 or less and the value ΔHS was 0 or more and less than 5.

The friction unit in Comparative Example 3 contained a styrene-based elastomer (trade name of "AR-885C" produced by Aronkasei Co., Ltd.). The friction unit in Comparative Example 3 had a value of the Shore A hardness immediately after starting contact with the indenter of 88. In this respect, the friction unit in Comparative Example 3 did not satisfy the condition of the present invention, in which the value of the Shore A hardness immediately after starting contact with the indenter was 60 or more and 85 or less.

The friction unit in Comparative Example 4 was prepared using a commercially available regular eraser containing a vinyl chloride resin (product number "ER-F6" produced by Pilot Corp.) as the material. The friction unit in Comparative Example 4 had a value of the Shore A hardness immediately after starting contact with the indenter of 50 and a value ΔHS of 25. In these respects, the friction unit in Comparative Example 4 did not satisfy the conditions of the present invention, in which the value of the Shore A hardness immediately after starting contact with the indenter was 60 or more and 85 or less and the value ΔHS was 0 or more and less than 5.

Each friction unit in Examples 1 through 4 and Comparative Examples 1 through 4 was used to erase handwriting in the thermochromic writing instrument 103 for evaluation of erasability, wear crumbs, continuous erasability, and an erasable amount described below.

Evaluation of Erasability

Eight sheets of white paper and eight sheets of black paper were prepared. The white paper was the "writing paper A" (chemical pulp 100%, brightness of 75.0 or more) in accordance with JIS P3201 of Japan Industrial Standard. The black paper was paper in black color containing chemical pulp 100%. The white paper and the black paper had a thickness of 0.09 mm and a mass per unit area of 80 g/m². Using the thermochromic writing instrument 103, handwriting in the thermochromic ink composition 161 was formed on each surface of the white paper and the black paper. The handwriting was in a circular spiral pattern. Ten spiral patterns were drawn by hand in one row on each sheet of the paper surface. Then, each friction unit in Examples 1 through 4 and Comparative Examples 1 through 4 was used to erase the ten spiral patterns formed on each surface of the white paper and the black paper. The state of the paper surface after erasure was visually checked.

The evaluation of the erasability in Table 1 was as follows:
 A: the handwriting was erased without leaving the color;
 B: the pink color of the thermochromic pigment or the silver color of the metallic luster pigment was slightly remained; and
 C: the pink color of the thermochromic pigment or the silver color of the metallic luster pigment was not erased.

Evaluation of Wear Crumbs

In the evaluation of the erasability described above, the ten spiral patterns formed on each surface of the white paper and the black paper were erased using each friction unit in Examples 1 through 4 and Comparative Examples 1 through 4 and then the state of the wear crumbs generated from each friction unit were visually checked.

The evaluation of the wear crumbs in Table 1 was as follows:
- A: no practical problems were found;
- B: a practical problem was found that the wear crumbs adhered to the friction unit; and
- C: a practical problem was found that a large amount of wear crumbs were generated.

Evaluation of Continuous Erasability

Eight sheets of white paper were prepared. The white paper was the "writing paper A" (chemical pulp 100%, brightness of 75.0 or more) in accordance with JIS P3201 of Japan Industrial Standard. The white paper had a thickness of 0.09 mm and a mass per unit area of 80 g/m². Using the thermochromic writing instrument 103, handwriting in the thermochromic ink composition 161 was formed on the surface of the white paper. The handwriting was in a circular spiral pattern. Ten spiral patterns were drawn by hand in each of the 30 rows, 300 patterns in total, on each sheet of the paper surface. Then, each friction unit in Examples 1 through 4 and Comparative Examples 1 through 4 was used to continuously erase the spiral patterns in 30 rows formed on each surface of the eight sheets of the white paper. In the process of erasing the spiral patterns in the 30 rows, for how many rows the friction performance of each friction unit immediately after starting erasure was maintained was visually checked. In the evaluation of the continuous erasability, the erasability of the metallic luster pigments and the state of the wear crumbs were not considered.

The evaluation of the continuous erasability in Table 1 was as follows:
- A: the friction performance immediately after starting erasure was maintained until erasing the spiral patterns in the 30 rows;
- B: the friction performance immediately after starting erasure was maintained until erasing the spiral patterns in the 20 rows; and
- C: the friction performance immediately after starting erasure was maintained until erasing the spiral patterns in the 10 rows.

Evaluation of Erasable Amount

In the evaluation of the continuous erasability described above, all the spiral patterns in the 30 rows were erased with each friction unit in Examples 1 through 4 and Comparative Examples 1 through 4. Then, the amount of the thermochromic ink composition 161 consumed to draw the spiral patterns in the 30 rows by hand and the amount of wear of the friction unit to erase the spiral patterns in the 30 rows were measured. Based on these measured values, the weight (erasable amount) of the thermochromic ink composition 161 allowing each friction unit in Examples 1 through 4 and Comparative Examples 1 through 4 to erase until wearing all the friction portion was calculated. What percentage of the ink weight stored in one refill 104 the erasable amount was equivalent to was calculated for evaluation of practical utility of each friction unit.

The evaluation of the erasable amount in Table 1 was as follows:
- A: no problem was found in the practical utility because 30% or more of the ink weight for one refill was erased; and
- C: a problem was found in the practical utility because 30% or more of the ink weight for one refill was not erased.

Second Example

In Second Example, the friction unit 201 and a thermochromic writing instrument 203 illustrated in FIG. 6 in the third embodiment were used. The thermochromic writing instrument 203 was configured same as the thermochromic writing instrument 103 in First Example described above. The friction unit 201 was an article separated from the thermochromic writing instrument 203. The combination of the friction unit 201 with the thermochromic writing instrument 203 configured one writing set 209.

The friction unit 201 was fit to the distal end portion of a support 202 formed from a hard PP resin (polypropylene). The portion of the friction unit 201 projecting from the distal end of the support 202 was to be a friction portion 211. The friction portion 211 was used to chemically and physically erase thermochromic ink to which a metallic luster pigment was added. Both the friction unit 201 and the support 202 had cross sections in oval shapes. The same materials as those of Examples 1 through 4 and Comparative Examples 1 through 3 in Table 1 above were used for injection molding of seven friction units 201.

Meanwhile, the components of the thermochromic ink composition 161 used for the thermochromic writing instrument 203 are the same as those in First Example described above. That is, the thermochromic ink composition 161 contained the components of a reversible thermochromic pigment (11 parts), a transparent metallic luster pigment (3 parts), a metallized resin pigment (2 parts), a shear thinner (0.3 parts), urea (10 parts), glycerin (10 parts), a nonionic penetration agent (0.6 parts), a hydrophobic silica-based defoamer (0.1 parts), an antiseptic (0.1 parts), and water (62.9 parts).

However, the reversible thermochromic pigment was configured to contain a reversible thermochromic composition changing the color from being colored in blue to being colorless in microcapsules. As the transparent metallic luster pigment, a pigment under the trade name of "Iriodin® 6107 Icy White Lightning" produced by Merck KGaA was used. The transparent metal pigment was formed from particles in silver color having an average particle diameter of 25 µm.

Similar to First Example described above, the thermochromic ink composition 161 was stored in the refill 104 of the thermochromic writing instrument 203. The pen point 105 of the refill 104 was a ball-point pen tip. The operating portion 184 was slid forward to cause the pen point 105 of the refill 104 to be in the projected state or the retracted state.

Using the thermochromic writing instrument 203, handwriting in the thermochromic ink composition 161 was formed on a paper surface of "writing paper A" (chemical pulp 100%, brightness of 75.0 or more) in accordance with JIS P3201 of Japan Industrial Standard. The thermochromic pigment in blue color was the base of the handwriting, and the transparent metallic luster pigment and the metallized resin pigment in silver color were dispersed in the handwriting. As a result, the handwriting in the thermochromic ink composition 161 exhibited metallic blue color on a white paper surface. In addition, handwriting in the thermochromic ink composition 161 was formed on a black paper surface. As a result, the hue of the handwriting formed on the black paper surface was similar to the case of the white paper surface. However, the lustrous properties of the handwriting formed on the black paper surface was particularly higher than the case of the white paper surface.

As described above, the same materials as those of Examples 1 through 4 and Comparative Examples 1 through 3 in Table 1 were used for injection molding of the seven friction units 201. Each of the seven friction units 201 was combined with the thermochromic writing instrument 203 to configure the seven writing sets 209. Each of the seven writing sets 209 was used for evaluation of the erasability, the wear crumbs, the continuous erasability, and the erasable amount. The results of evaluation were the same as Examples 1 through 4 and Comparative Examples 1 through 3 in Table 1.

All the four friction units 201 containing the same materials as those of Examples 1 through 4 in Table 1 had good results in the erasability test. The handwriting in the thermochromic ink composition 161 was repeatedly abraded with the friction portion 211. The friction portion 211 then generated frictional heat to cause the thermochromic pigment in the handwriting to change the color from being colored in blue to being colorless and transparent. In addition, the friction portion 211 with low hardness entered the indentation of the handwriting to adsorb and separate the transparent metallic luster pigment and the metallized resin pigment in silver color from the paper surface. Moreover, the transparent metallic luster pigment and the metallized resin pigment adsorbed by the friction portion 211 were enclosed in wear crumbs of the friction portion 211 to be fully removed from the paper surface. The friction unit 201 thus neatly erased the handwriting in the thermochromic ink composition 161 without smudging the paper surface. In particular, there used to be a problem that the transparent metallic luster pigment and the metallized resin pigment remained on black paper were lustrous depending on the visual angle and visually recognized. This problem was solved by using the friction unit 201.

DESCRIPTION OF REFERENCE NUMERALS

1 Barrel
2 Attachment Hole
21 Inward Projection
21*a* Guide surface
21*b* Minimum Inner Diameter Portion
3 Friction Unit
31 Internal Hole
32 Friction Portion
4 Large Diameter Portion
41 Annular Surface
5 Attachment Portion (Small Diameter Portion)
51 Outward Projection
51*a* Guide Surface
51*b* Maximum Outer Diameter Portion
52 Bulged Portion
53 cylindrical portion
6 Annular Space
7 Inner Core
71 Vent Portion
72 Upper Core Portion
73 Lower Core Portion
A Axial Length from Upper End of Attachment Portion to Upper End of Outward Projection
B Axial Length from Upper End of Attachment Hole to Lower End of Inward Projection
C Clearance between Inward Projection and Outward Projection

The invention claimed is:

1. A thermochromic writing instrument, comprising: thermochromic ink; and a friction unit configured to cause handwriting in the thermochromic ink to undergo a thermochromic change by frictional heat, wherein the thermochromic ink includes a metallic luster pigment added thereto, the thermochromic writing instrument is provided with an attachment hole to attach the friction unit, the friction unit includes an attachment portion to be inserted into the attachment hole and a friction portion in a convex curved surface shape projecting from the attachment hole, the friction portion has a volume Ve and the metallic luster pigment has a volume Vp, the volume Ve and the volume Vp satisfying $5 \leq Ve/Vp \leq 35$, the friction portion has a maximum outer diameter D and a projection length L, the diameter D and the length L satisfying $0.1 \leq L/D \leq 1.5$, and a material for the friction unit has a value of Shore A hardness in accordance with JIS K 7215 of Japan Industrial Standard measured immediately after starting contact with an indenter in a range of 60 or more and 85 or less and has a value ($\Delta HS$) of the Shore A hardness defined by a following equation of 0 or more and less than 5, $\Delta HS$=(Shore $A$ Hardness Value immediately after Starting Contact with Indenter)−(Shore $A$ Hardness Value 15 seconds after Starting Contact with Indenter).

2. The thermochromic writing instrument according to claim 1, wherein the material for the friction unit has a value (Tb×Eb) of a product of tensile strength Tb at break and elongation Eb at break measured in accordance with JIS K 6251 of Japan Industrial Standard of 5000 or more and 18000 or less.

3. The thermochromic writing instrument according to claim 1, wherein the attachment hole is provided through a rear end portion of a barrel or an apex of a cap, the barrel and the cap configuring the thermochromic writing instrument, along a longitudinal central axis and has an inner circumferential surface between two openings located at an upper end and a lower end, an inward projection projecting inside the attachment hole is formed on the inner circumferential surface of the attachment hole, an outward projection projecting outside the attachment portion is formed on an outer circumferential surface of the attachment portion, when the attachment portion is inserted into the attachment hole, the outward projection rides over the inward projection to lock the outward projection and the inward projection to each other, the friction unit is provided with a straight internal hole along a longitudinal central axis and opening at least at a lower end of the attachment portion, a rod-like inner core is inserted into the internal hole, the rod-like inner core having a length to be placed within the internal hole and an outer circumferential surface contacting an inner circumferential surface of the internal hole, and, in a state where the attachment portion is inserted into the attachment hole and the inner core is inserted into the internal hole, the inner core is held in a position corresponding to the inner circumferential surface of the attachment hole to configure the attachment portion to be sandwiched between the outer circumferential surface of the inner core and the inward projection of the attachment hole.

4. The thermochromic writing instrument according to claim 3, wherein, in the state where the attachment portion is inserted into the attachment hole and the inner core is inserted into the internal hole, the inner core has a length from an opening at a lower end of the internal hole to the opening at the upper end of the attachment hole.

5. The thermochromic writing instrument according to claim 3, wherein, in the state where the attachment portion is inserted into the attachment hole and the inner core is inserted into the internal hole, a lower end of the inner core is located in a position identical to the lower end of the attachment portion or above the lower end of the attachment portion.

6. The thermochromic writing instrument according to claim 3, wherein the internal hole is a hole with one closed end opening at the lower end of the attachment portion and not opening at an upper end of the friction portion and, in a process of inserting the inner core into the internal hole, the inner core is provided with a vent portion to discharge air in the internal hole.

7. The thermochromic writing instrument according to claim 6, wherein the vent portion is a through hole penetrating the inner core from an end to another end along a longitudinal central axis of the inner core.

8. The thermochromic writing instrument according to claim 6, wherein the vent portion is at least one groove or projection continuing from an end to another end of the inner core along the outer circumferential surface of the inner core.

9. The thermochromic writing instrument according to claim 3, wherein the inner core has a vertically symmetrical shape.

10. The thermochromic writing instrument according to claim 3, wherein the outer circumferential surface of the inner core is provided with a convex portion contacting the inner circumferential surface of the internal hole.

\* \* \* \* \*

UNITED STATES PATENT AND TRADEMARK OFFICE
CERTIFICATE OF CORRECTION

PATENT NO. : 12,275,269 B2
APPLICATION NO. : 17/915815
DATED : April 15, 2025
INVENTOR(S) : Takeshi Hashimoto It is certified that error appears in the above-identified patent and that said Letters Patent is hereby corrected as shown below:

On the Title Page

Column 2, Abstract, Line 13, delete "$5 \square Ve/Vp \square 35$," and insert -- $5 \leq Ve/Vp \leq 35$, --

Column 2, Abstract, Line 15, delete "$0.1 \square L/D \square 1.5$," and insert -- $0.1 \leq L/D \leq 1.5$, --

Signed and Sealed this
Fifteenth Day of July, 2025

Coke Morgan Stewart
*Acting Director of the United States Patent and Trademark Office*